Fig. 2.

United States Patent Office
3,164,035
Patented Jan. 5, 1965

3,164,035
POWER TRANSMISSION SYSTEMS PROVIDING AUTOMATIC CHANGES OF GEAR RATIO
Frederick Edward Ellis, Peter John Standbridge, and Maurice Taylor, Leamington Spa, England, assignors to Automotive Products Company Limited, Leamington Spa, England, a British company
Filed Mar. 27, 1961, Ser. No. 98,686
10 Claims. (Cl. 74—757)

This invention relates to power transmission systems providing automatic changes of gear ratio, and has for its object to provide a power transmission system, especially for motor vehicles, which is compact, and efficient in operation.

According to the present invention, in an automatic change-speed gearbox comprising a speed reducing gear train consisting of an input gear, driving means to rotate said input gear in one direction, first and second output gears, an intermediate gear assembly through which rotation of the input member is transmitted to both output gears to tend to rotate them in opposite directions one relative to the other, said intermediate gear assembly being mounted on a carrier rotatable about the axis of said input gear, means for selectively connecting said output gears to a driven shaft to produce rotation of said driven shaft in opposite directions, a freewheel device to hold said carrier against rotation in a direction opposite to the direction of rotation of the input gear, means operable to lock said gears together to rotate as one, and a speed-sensitive device controlling the operation of said locking means, further means, also controlled by the speed-sensitive device, are provided to resist rotation of said second output gear in the opposite direction to the input gear when said input and output gears are free for relative rotation and said output gear is connected to the driven shaft, so that the carrier is caused, by rotation of the input gear, to rotate about the axis of the input gear and rotate the first output gear at a speed having a ratio to the speed of the input gear less than the ratio provided when the second output gear is free to rotate.

The means to resist rotation of the second output gear may comprise a brake and a second freewheel device, the said second freewheel device allowing the second output gear to rotate, when the brake is engaged, in the same direction as the input gear, so that the gears can rotate, when locked together, whilst the brake is in engagement.

Preferably, the input and output gears are bevel gears all mounted co-axially and the intermediate gear assembly comprises at least one pair of bevel gears of different sizes fixed together so as to rotate as one, the larger bevel gear of the pair meshing with the input gear and the smaller bevel gear of the pair meshing, at diametrically opposite positions thereon, with the output gears.

The invention is hereinafter described with reference to the accompanying drawings which show one form of gearbox according to the invention together with a fluid torque converter through which drive is transmitted to the gearbox from the engine of the vehicle.

In the drawings:

FIGURES 15 to 20 are diagrams showing the torque transmission paths through the gearbox under different conditions;

Figure 1A:
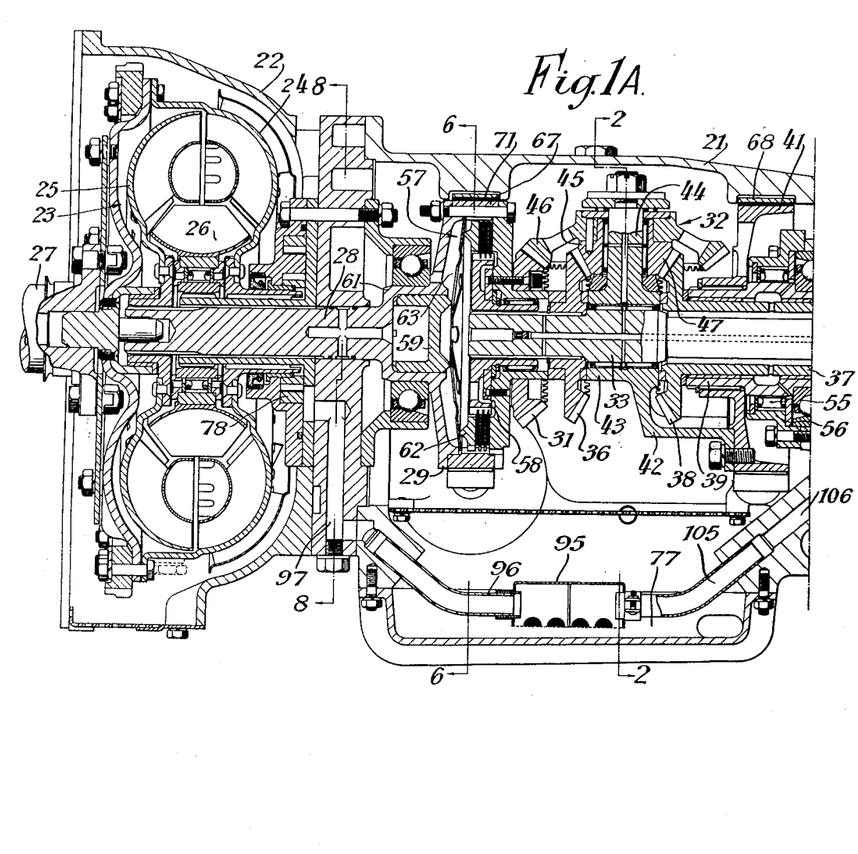
FIGURES 1A and 1B together show a longitudinal sectional elevation of the change-speed gearbox, FIGURE 1A showing the input end of the gearbox and FIGURE 1B showing the output end.
Figure 1B:
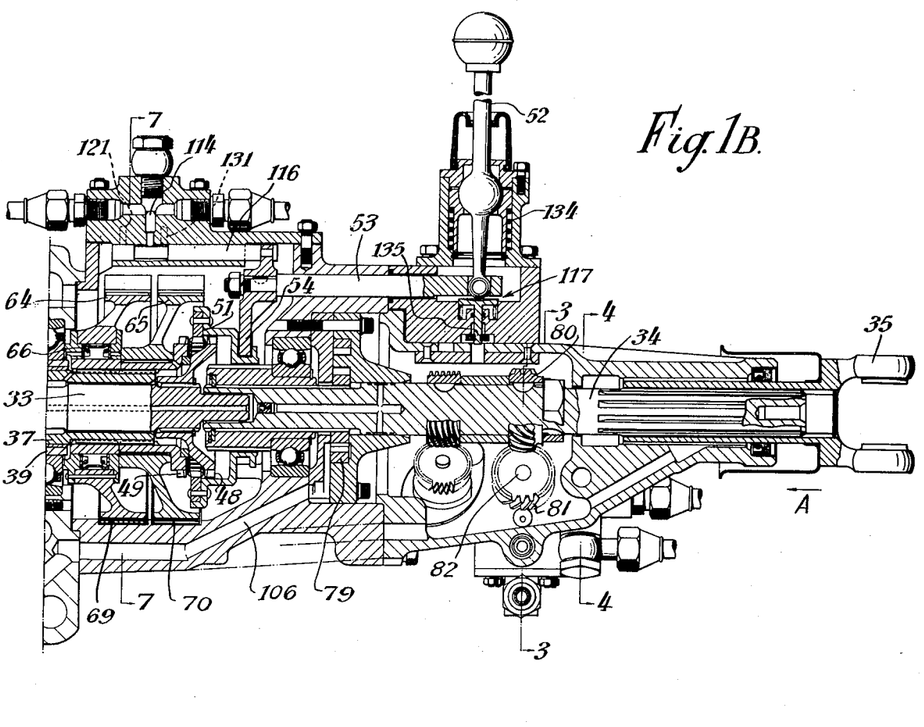
Figure 2:
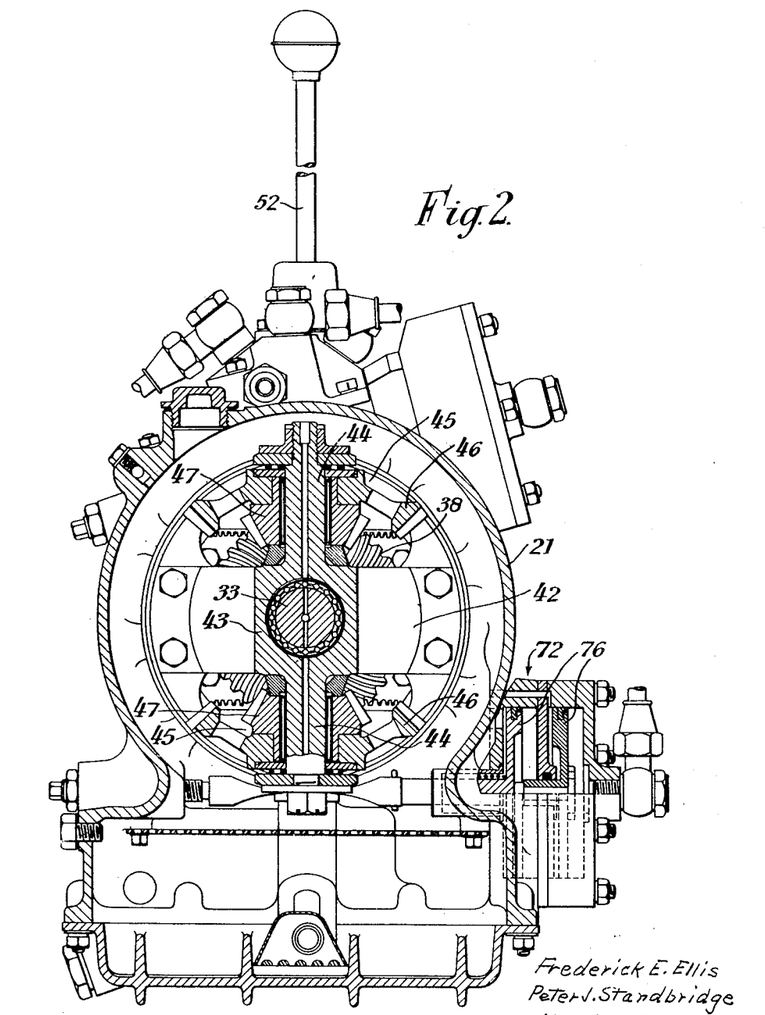
FIGURE 2 is a cross-section on the line 2—2 of FIGURE 1A.

Referring to FIGURES 1 and 2, the gearbox comprises a casing 21 enclosing the various shafts, gears and other elements, to one end of which is secured a housing 22 for a fluid torque converter 23 of known type including a pump member 24, a turbine member 25 and a reaction member 26. The pump member 24 is secured to the crankshaft 27 of an internal combustion engine (not shown) and the turbine member 25 is mounted on a shaft 28 extending into the casing 21. The shaft 28 carries, in the casing 21 a hollow disc-like member 29 on one face of which is mounted a bevel gear 31 constituting the input gear of a speed-reduction train generally indicated by the reference 32. An intermediate shaft 33, co-axial with the shaft 28, is journalled at one end in the member 29, and at its other end in a co-axial output shaft 34 (FIGURE 1B) carrying, at the output end of the gearbox, one element 35 of a universal joint through which the drive is transmitted to a propeller shaft, not shown.

The intermediate shaft 33 has fixed to it a first output gear 36 in the form of a bevel gear, and a first sleeve 37, rotatable around the intermediate shaft 33, has integral with it a second output gear 38 in the form of a bevel gear, the two bevel gears 36 and 38 facing in opposite directions.

A second sleeve 39, rotatable in the casing 21 and rotatably supporting within it the first sleeve 37, has fixed to it a brake drum 41 to which is secured by outrigger arms 42, a carrier 43 (FIGURES 1A and 2) including radial trunnions 44 on which are mounted intermediate gear assemblies 45 each comprising a larger bevel gear 46 meshing with the input gear 31 and a smaller bevel gear 47 meshing with both output gears 36 and 38. The bevel gears 46 and 47 mounted on each trunnion 44 are fixed together to rotate as one, the sizes of the said bevel gears 46 and 47 being so selected that the output gears 36 and 38 rotate at a lower speed than the input gear 31, a convenient ratio being 2:1 when the carrier 43 is stationary.

The intermediate shaft 33 has fixed to it at its end adjacent the output shaft 34, as shown in FIGURE 1B, a dog-clutch member 48, and a second dog-clutch member 49 is fixed to the first sleeve 37. A co-operating dog-clutch member 51 is slidably mounted on splines on the output shaft 34 and is movable, by a manually operable selector lever 52 acting through a slide rod 53 and a fork 54 to engage selectively with the dog-clutch members 48 and 49 to provide a driving connection between the intermediate shaft 33 and the output shaft 34, or between the first sleeve 37 and the output shaft 34.

A freewheel device 55 (FIGURE 1A) is mounted between the second sleeve 39 and a ring 56 bolted to the casing 21, the said freewheel device 55 allowing the second sleeve 39, and the carrier 43 which is fixed to it, to rotate in the same direction as the input gear 31, but preventing rotation of those parts in the opposite direction.

The hollow disc-like member 29 constitutes the driving member of a multi-plate friction clutch 57 the driven member 58 of which is fixed to the intermediate shaft 33, alternate plates of the clutch being splined to the member 29 and the intermediate plates being splined to the member 58. The clutch 57 is brought into engagement by liquid pressure acting on a piston 59 slidable in a motor cylinder 61 co-axially formed in the member 29, the liquid pressure acting on the pressure plate 62 of the clutch through a disc-type spring 63.

The first sleeve 37 has mounted on it two brake drums 64 and 65 (FIGURE 1B) a freewheel device 66 being provided between the said sleeve 37 and the brake drum 64 to allow rotation of the said sleeve, when the brake drum is held, in the same direction as the input gear 31. The brake drum 65 is fixed against rotation on the sleeve 37. The periphery of the member 29 constitutes another brake drum 67. Brake bands 68, 69, 70 and 71 co-operate with the brake drums 41, 64, 65 and 67 respectively, these brake bands being capable of being contracted into engagement with their respective drums by liquid pressure acting in motor cylinders.

Figure 6:
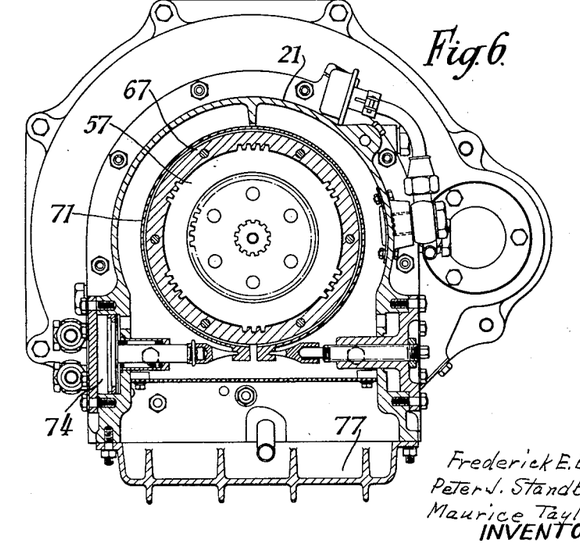
FIGURE 6 is a cross-section on the line 6—6 of FIGURE 1A.
Figure 7:
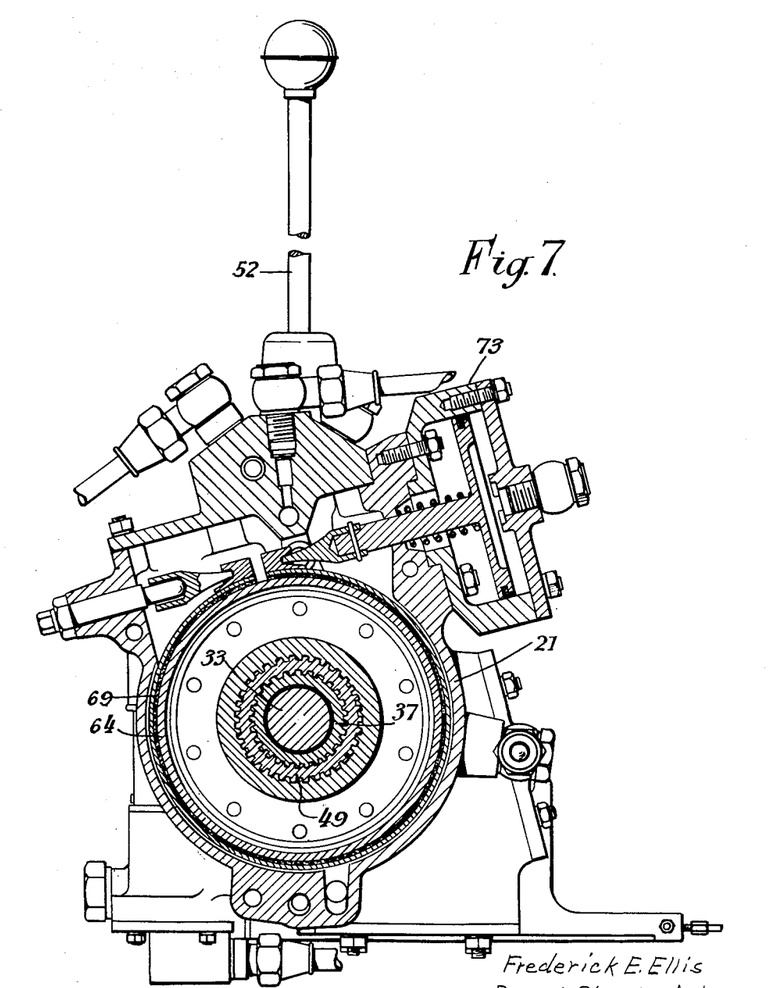
FIGURE 7 is a cross-section on the line 7—7 of FIGURE 1B.

The motor cylinder for contracting the brake band 68 is shown at 72 in FIGURE 2, the motor cylinder for contracting the brake band 69 is shown at 73 in FIGURE 7, and the motor cylinder for contracting the brake band 71 is shown at 74 in FIGURE 6. The motor cylinder 75 for contracting the brake band 70 is shown only in the diagrammatic FIGURES 9 to 14, but is similar to the motor cylinder 73. The motor cylinder 72 comprises two pistons 76 in tandem acting in separate cylinder chambers.

Liquid for operating the various motor cylinders, and for filling the torque converter 23, is contained in a sump 77 (FIGURE 1A) and is drawn from the sump and placed under pressure by two gear pumps 78 and 79, shown in FIGURES 1A and 1B respectively, and pump 78 being driven by the pump element 24 of the torque converter, and the pump 79 being driven by the output shaft 34. The connections between the pumps 78, 79 and the various motor cylinders are most clearly shown in the diagrammatic FIGURES 9 to 14 but some of the valves and passages included in these connections are shown in FIGURES 1 to 8.

Figure 3:
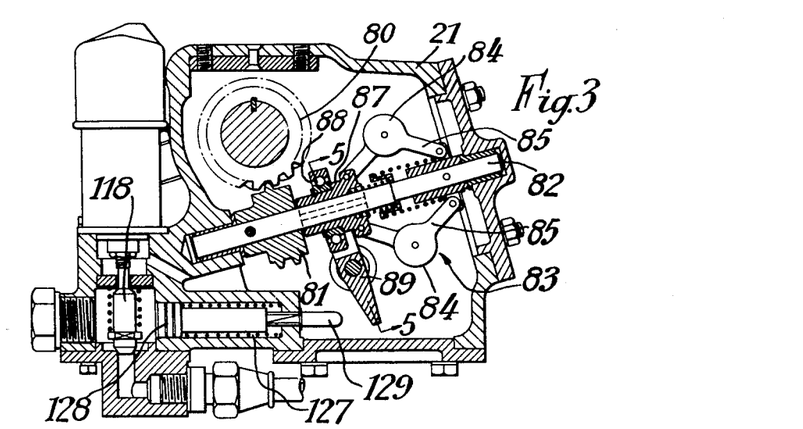
FIGURE 3 is a cross-section on the line 3—3 of FIGURE 1B.
Figure 4:
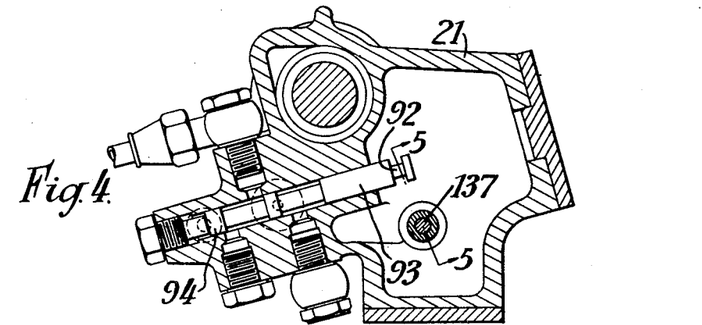
FIGURE 4 is a cross-section on the line 4—4 of FIGURE 1B.
Figure 5:
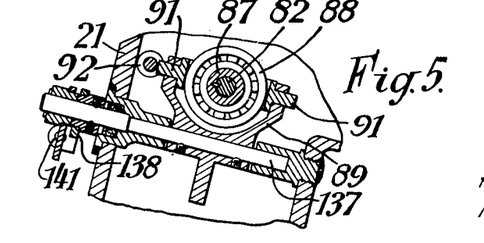
FIGURE 5 is a cross-section on the line 5—5 of FIGURES 3 and 4.

The output shaft 34 drives, through skew gears 80, 81 (FIGURES 1B and 3) a spindle 82 on which is mounted a centrifugal governor 83 comprising bob-weights 84 mounted at the elbows of linkages 85 each pivoted at one end to a sleeve 86 fixed to the spindle 82, and at their other ends to a sleeve 87 slidable on the said spindle. The sleeve 87 carries a ball bearing 88 the outer race of which is engaged between fork arms on one end of a rocking member 89 (FIGURES 3 and 5), so that the rocking member moves about its axis as the bob-weights 84 move in and out. The fork arms on the rocking member 89 carry headed studs 91, pivoted in the said arms, the heads of the studs 91 being slotted diametrally to engage the outer race of the ball bearing 88. The stem of one of the studs 91, as shown in FIGURE 5, engages in a groove 92 in one end of a valve plunger 93 (FIGURE 4) slidable in a bore 94 in the casing 21. The valve 93, 94 is thus controlled in accordance with the position of the bob-weights of the centrifugal governor 83, and as will be hereinafter described, controls changes of the gear ratio in the gearbox.

Figure 8:
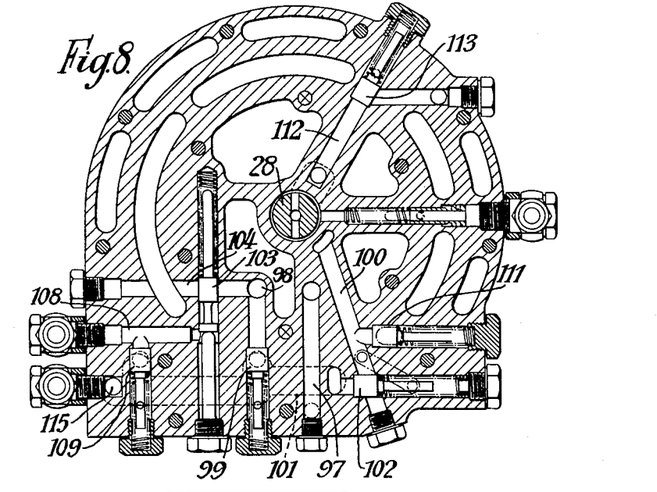
FIGURE 8 is a cross-section on the line 8—8 of FIGURE 1A.
Figure 8A:
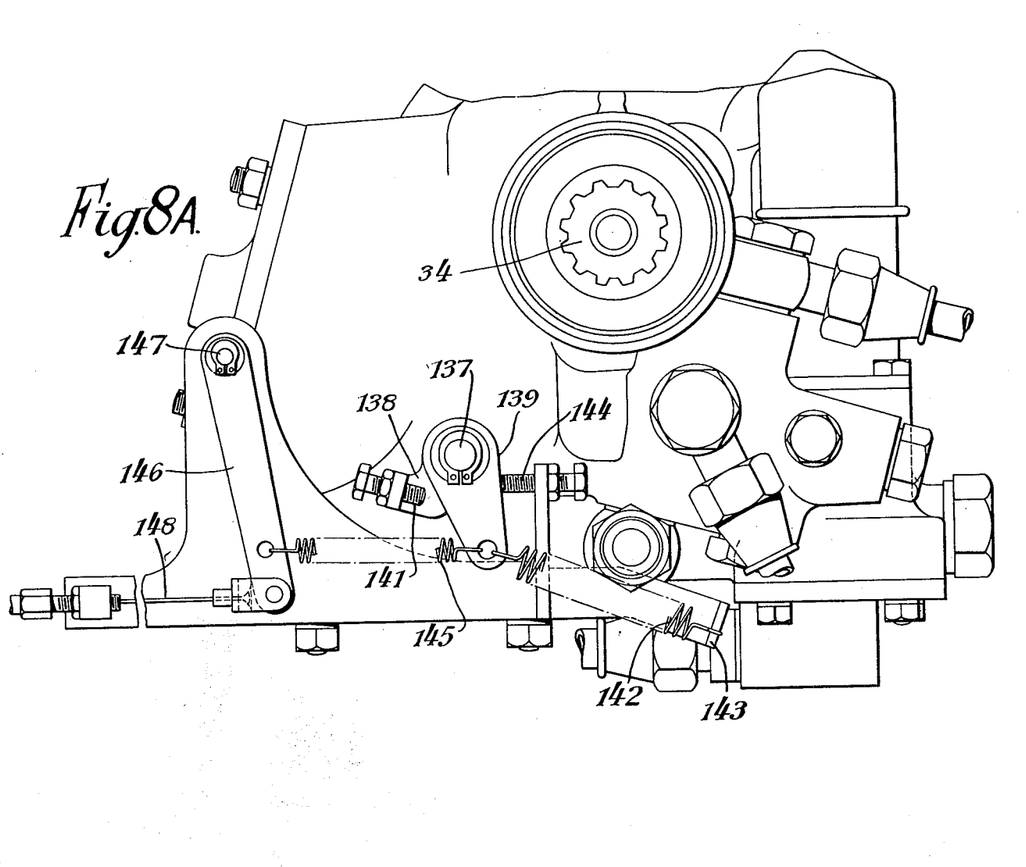
FIGURE 8A is a partial end view looking in the direction of the arrow A in FIGURE 1B.

The rocking member 89 is fixed, as shown in FIGURE 5, to a shaft 137 extending out through the wall of the gearbox casing and having fixed on it, outside the said casing, a cranked arm 138 (FIGURES 5 and 8A). Also mounted on the shaft 137 is an arm 139 which is rotatable thereon but is arranged to transmit rotation to the shaft 137, in a direction to cause the rocking member 89 to oppose outward movement of the bob-weights 84 of the centrifugal governor, through an adjustable stop 141 on the arm 138. The arm 139 is urged by a tension spring 142, anchored at 143 to the casing, against a fixed stop 144, and is coupled by another tension spring 145 to an arm 146, pivoted at 147 on the casing, and coupled by a cable 148 to the throttle pedal (not shown) of the vehicle. The arrangement is such that, as the throttle pedal is depressed, the spring 145 is progressively tensioned and overcomes the spring 142 so that, when it brings the arm 139 into engagement with the stop 141, it applies a load to the centrifugal governor opposing the outward movement of the bob-weights 84.

Thus the changes of gear ratio in the gearbox depend both on the speed of the output shaft and the position of the throttle pedal, the changes taking place at progressively higher speeds of the output shaft with increase of depression of the throttle pedal.

The liquid pressure circuit of the gearbox will now be described primarily with reference to FIGURE 9 of the drawings, but also with reference to FIGURES 1 to 8 so far as the actual positions of the various valves are concerned.

The pump 78 draws liquid (lubricating oil) from the sump 77 through a filter 95, conduit 96 and passage 97, (FIGURES 1A and 8) and delivers it through a passage 98 (FIGURE 8) to a non-return valve 99 through which it passes into a further passage 101 and a pressure control valve 102 to a passage 100 leading to the torque converter 23. The passage 98 also leads to a valve 103 which, in the position shown in FIGURE 8, isolates it from a drain passage 104 leading back to the sump 77.

Figure 9:
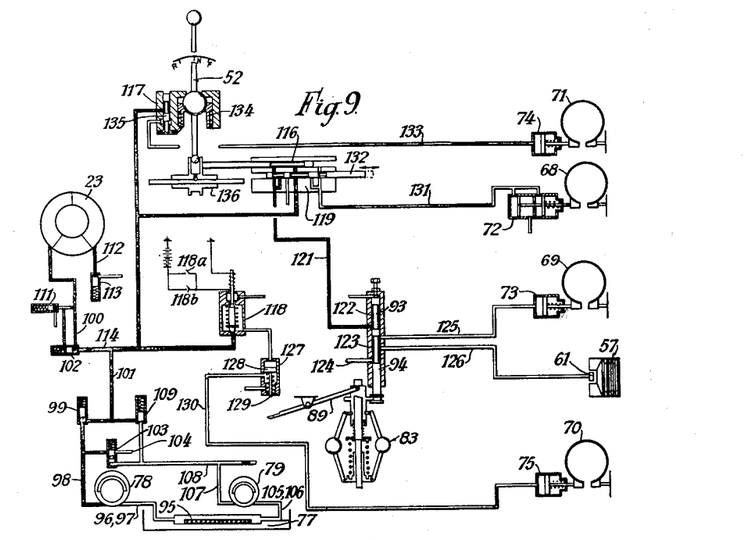
FIGURE 9 is a diagram of the liquid pressure control system for the gearbox shown in FIGURE 1, showing conditions when the gearbox is in the neutral position and the engine is idling.

The pump 79 draws oil from the sump 77 through the filter 95, a conduit 105 and a passage 106, and delivers it through a conduit 107, shown only in FIGURE 9, to a passage 108 (FIGURE 8) and through a non-return valve 109 into the passage 101. Liquid in the passage 108 also acts on the valve 103 to open the connection between the passage 98 and the drain passage 104. Thus, when only the pump 78 is working, liquid is fed by it to the torque converter, but when the pump 79 is also working, that pump supplies liquid to the torque converter, and, by opening the valve 103 causes the pump 78 to circulate liquid idly back to the sump. Another valve 111 connected to the passage 100 serves to control the pressure acting in the torque converter, the said valve 111 returning excess liquid to the sump.

Liquid leaves the torque converter through a passage 112 and a non-return valve 113, liquid passing through the valve 113 being led to points in the gearbox requiring lubrication.

A conduit 114 connected at 115 (FIGURE 8) to the passage 101 conveys liquid from the pumps to the various motor cylinders. The conduit 114 is branched, as shown in FIGURE 9, the branches being connected respectively to a slide valve 116 (FIGURE 1B) operated by the selector lever 52, a two-way valve 117 (FIGURE 1B) also operated by the selector lever 52, and a solenoid operated valve 118, shown in FIGURES 3 and 9. The slide valve 116 is associated with another slide valve 119, shown only in FIGURE 9, and operated by the driver of the vehicle in any convenient manner, for example by a pull knob on the dashboard.

The slide valve 116, when the selector lever is in the neutral position, as shown in FIGURE 9, connects the conduit 114 to a conduit 121 leading to the slide valve 93, 94, the plunger 93 of which is formed with two circumferential grooves 122, 123 (FIGURES 4 and 9) the groove 122 being permanently connected to the conduit 121. The groove 123 is permanently connected to a drain passage 124, and two conduits 125 and 126 lead from the valve bore 94 to the motor cylinder 73 and to the motor cylinder 61 respectively, these conduits 125 and 126 being in communication with the groove 123 when the driven shaft 34 is rotating at too low a speed to operate the governor 83, and being brought into communication with the groove 122 in succession as the governor 83 is operated.

The solenoid-operated valve 118 is normally closed but, when the solenoid is energised, is opened to admit liquid to a cylinder 127 where it acts on a piston 128 and moves the said piston to open a port leading by way of a conduit 130 to the motor cylinder 75. This port is normally in communication with the sump 77.

Movement of the piston 128 also causes a stem 129 to act on the rocking member 89, in opposition to the centrifugal governor 83, to move the valve plunger 93 as will be hereinafter described. The solenoid is energised by closing either one of two switches 118a and 118b, the former being manually operable and the latter being closed automatically by depressing the accelerator pedal of the vehicle to the maximum extent.

The slide valve 116, when moved by the selector lever 52 to the left in FIGURE 9, for selecting forward drive, still connects the conduits 114 and 121 together, but when moved to the right, for selecting reverse gear, connects the conduit 114 to another conduit 131 leading to the motor cylinder 72 acting on the brake band 68 to hold the carrier 43 against rotation.

Figure 11:
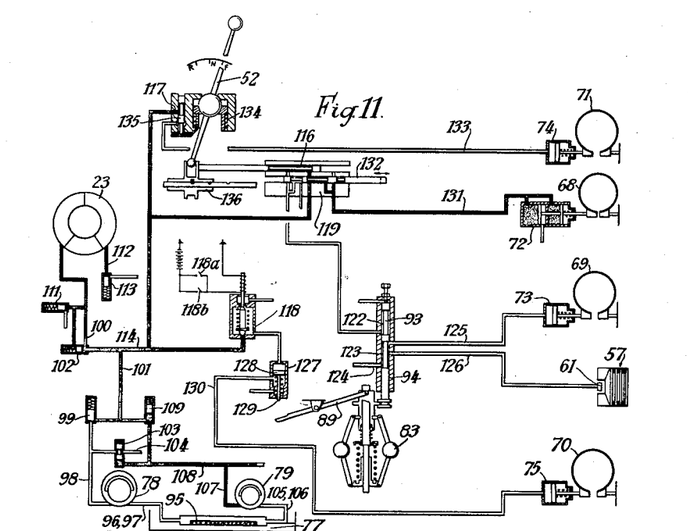
FIGURE 11 is a diagram corresponding to FIGURE 9 but showing the conditions when low forward gear is engaged.

The plunger 132 of the slide valve 119 in the position shown in FIGURE 9, allows the various connections referred to in the last preceding paragraph to be made, but when moved to the right, as shown in FIGURE 11, admits liquid to the motor cylinder 72 whilst the selector lever 52 is in the forward drive position, for a purpose to be hereinafter described.

The valve 117 is normally in a position in which a connection thereof to the conduit 114 is closed, and a conduit 133 connecting the said valve to the motor cylinder 74 is open to drain. Depression of the selector lever 52 against a spring 134 moves the valve plunger 135 to admit liquid under pressure to the motor cylinder 74 and so contract the brake band 71 and hold the member 29 against the drag imparted thereto by the torque converter 23.

The selector lever, as shown diagrammatically in FIGURE 9 may be provided with a ball detent device 136 to hold it in the neutral, forward drive and reverse drive positions.

The following description which referes to FIGURES 9 to 14 showing the liquid pressure circuit, and to FIGURES 15 to 20 showing the gearbox mechanism sets out the manner in which the various gear ratios are obtained, and how the drive is transmitted to the output shaft in the different ratios. For convenience of illustration, the selector lever 52 has been shown as moving to the right for forward drive in FIGURES 9 to 14, and to the left for forward drive in FIGURES 15 to 20. Thus a movement in one direction with reference to FIGURES 9 to 14 corresponds to an opposite movement with reference to FIGURES 15 to 20.

In FIGURES 9 to 14, those liquid conduits in which pressure exists are shaded, and in FIGURES 15 to 20 those parts of the transmission through which torque is being transmitted are shaded.

Figure 14:
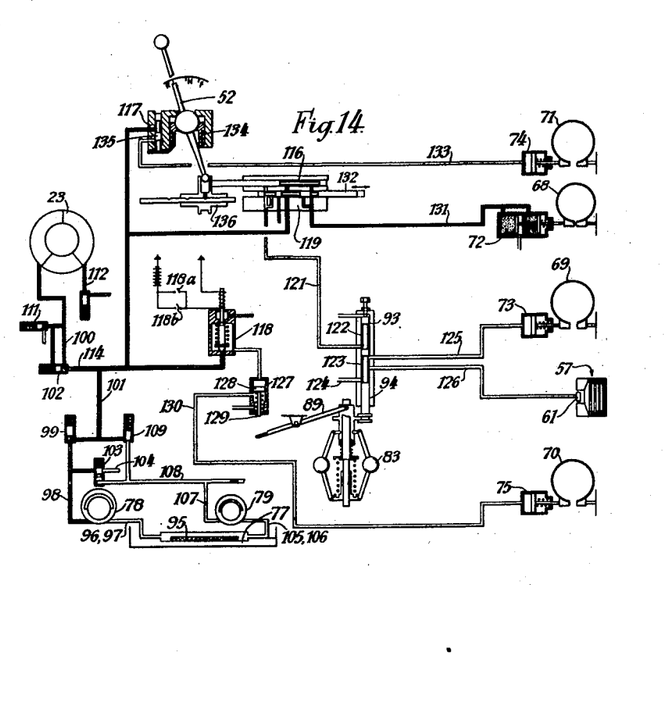
FIGURE 14 is a diagram corresponding to FIGURE 9 but showing conditions when reverse gear is engaged.
Figure 15:
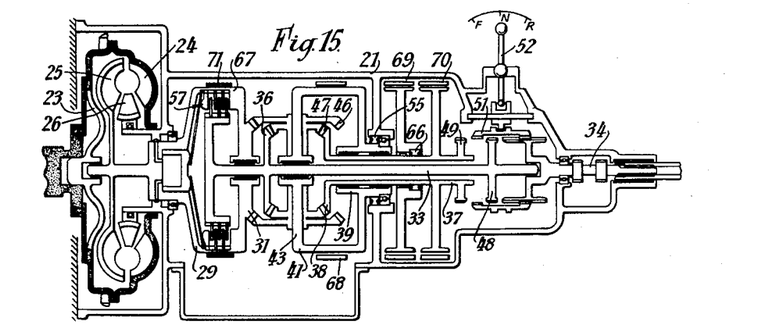
FIGURE 15 showing the gearbox in neutral.

Referring first to FIGURES 9 and 14, which show the gearbox in the neutral position with the engine of the vehicle running, liquid is being delivered by the pump 78 through the non-return valves 99 and 102 to the torque converter, and the conduits leading to the valves 117, 93, 94 and 118 are under pressure, but the flow of liquid is stopped at those valves. The selector lever 52 is in the neutral position, so that the dogs 48, 49, 51 are disengaged.

No torque is therefore transmitted beyond the pump 24 of the torque converter, but, due to drag in the said torque converter, the member 29, the gear train and the shaft 33 and sleeves 37, 39 may rotate idly.

Figure 10:
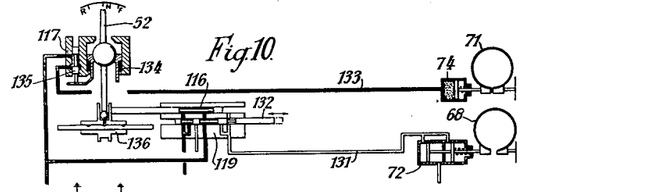
FIGURE 10 is a diagram corresponding to part of FIGURE 9 but showing a brake on the turbine of the torque converter engaged.
Figure 16:
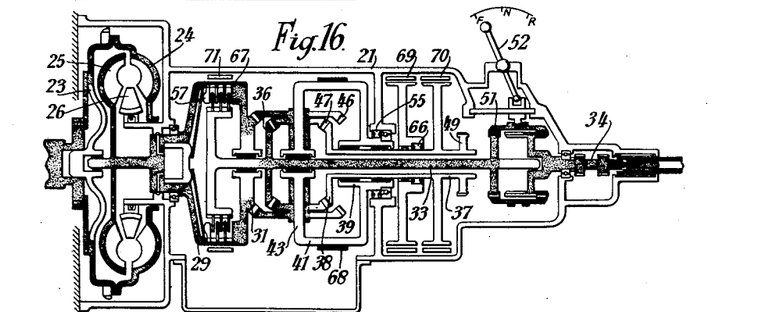
FIGURE 16 showing the gearbox with low forward gear engaged.

Assuming that forward drive is to be selected, the selector lever 52 is first depressed to operate the valve 117, as shown in FIGURE 10, thus admitting liquid under pressure to the motor cylinder 74 to contract the brake band 71 on the member 29 and hold the said member against rotation due to the torque converter drag. The selector lever is then moved to the right from the position shown in FIGURE 9 to that shown in FIGURES 11 and 12 to engage the dogs 51 with the dogs 48, so connecting the intermediate shaft 33 to the output shaft 34, as shown in FIGURE 16. The liquid pressure connections return to the position shown in FIGURE 9 when the selector lever 52 is released. If the engine is now speeded up, the torque converter drives the member 29 and input gear 31, the latter driving the bevel gears 46 and 47 which in turn drive the output bevel gears 36 and 38. The drive resistance on the output shaft 34 applies a torque reaction to the carrier 43 tending to rotate it in the opposite direction to the input gear 31, but it is held against rotation in this direction by the freewheel device 55. The output gear 38 rotates idly.

If it is desired to provide engine braking with the gear box in this position, the slide valve 119 is operated to the position shown in FIGURE 11, thus causing the brake band 68 to be contracted on the drum 41 to prevent forward running of the carrier 43 which would tend to take place if the road wheels were running at a speed greater than that at which the engine was tending to drive them.

As the driven shaft 34 speeds up, the pump 79 begins to deliver liquid, and builds up pressure to open the non-return valve 109 and move the valve 103 to cause the liquid delivered by the pump 78 to be returned idly to the sump. The non-return valve 99 then closes, and, until the speed of the output shaft 34 falls again, liquid is supplied only by the pump 79.

Figure 12:
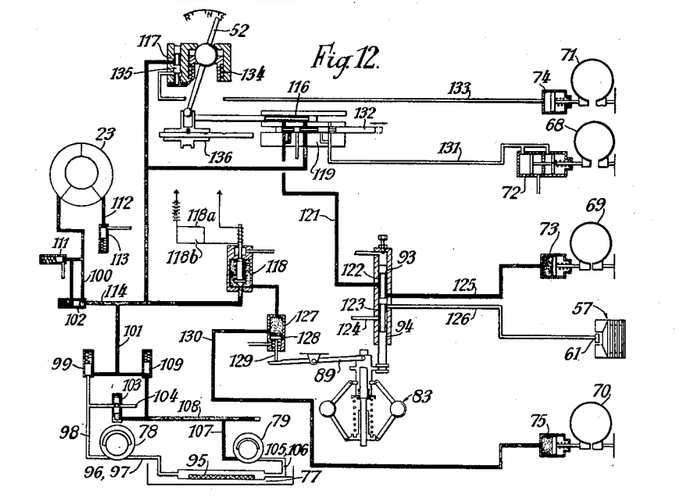
FIGURE 12 is a diagram corresponding to FIGURE 9 but showing the conditions when intermediate forward gear is engaged.
Figure 17:
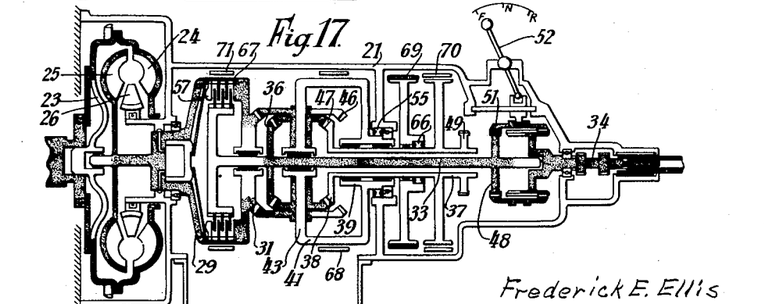
FIGURE 17 showing the gearbox with intermediate forward gear engaged.

As the road speed of the vehicle increases, the centrifugal governor 83 begins to move the plunger of the valve 93, 94, and at a road speed which may be greater or less depending on the throttle opening the said plunger moves far enough to connect the conduit 125 to the conduit 121, as shown in FIGURE 12, so that the brake band 69 is contracted on to the drum 64, and the sleeve 37 is held against rotation in the direction opposite to the driving gear 31, the brake band 69 being shown in this position in FIGURE 17. The carrier 43 is thus caused to rotate in the same direction as the driving gear 31, due to the bevel gear 47 rotating relative to the now stationary output gear 38 and to transmit rotation to the driven gear 36 with a smaller reduction ratio than when the output gear 38 was free.

Figure 18:
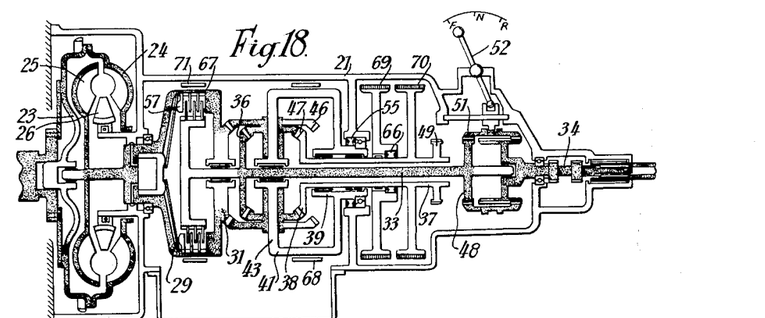
FIGURE 18 showing the gearbox with intermediate forward gear engaged and with engine braking.

If the road wheels tend to overrun the engine when these conditions obtain, the output gear 38, due to the presence of the freewheel device 66, can rotate in the same direction as the input gear 31, and the engine cannot act to retard the vehicle movement. Engine braking can however be obtained by operating the switch 118a to open the solenoid valve 118 and admit liquid under pressure to the cylinder 127, where it moves the piston 128 and passes to the motor cylinder 75 to contract the brake band 70 on to the brake drum 65 as shown in FIGURE 18 and hold the sleeve 37 against rotation in both directions. The liquid pressure connections for this condition are shown in FIGURE 12.

Figure 13:
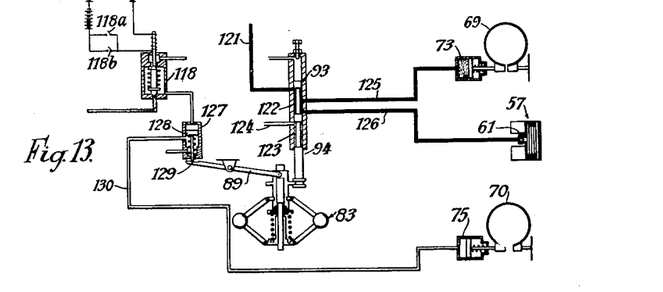
FIGURE 13 is a diagram corresponding to part of FIGURE 9 but showing conditions when the gearbox is set for transmitting direct drive.
Figure 19:
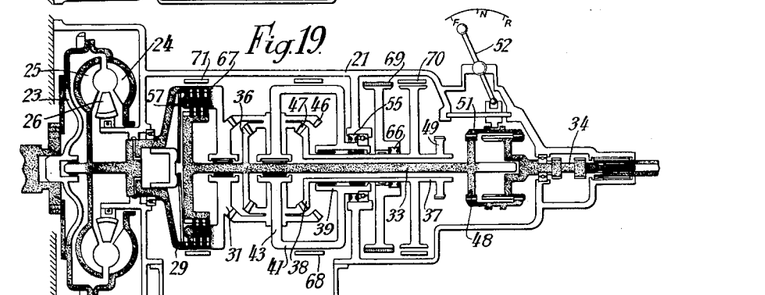
FIGURE 19 showing the gearbox with direct forward drive engaged.

Further increase in the road speed of the vehicle causes the centrifugal governor 83 to connect the conduit 126, as well as the conduit 125, to the conduit 121, the road speed at which this connection takes place also being greater for a larger throttle opening than for a smaller throttle opening due to the action of the spring 145. When this connection is made, liquid pressure acts in the motor cylinder 61 to engage the clutch 57 and connect the intermediate shaft 33 directly to the member 29, thus providing a direct drive. The freewheel device 66 allows the sleeve 37 to rotate with the intermediate shaft in the same direction as the input gear 31, so that the brake band 69 can be left in engagement, but the solenoid of the valve 118 must be de-energised to allow the sleeve 37 to rotate. The direct drive condition is shown in FIGURES 13 and 19. Direct drive can be obtained only when the switch 118a is open.

The immediately preceding description shows how upward changes of gear ratio are effected automatically with changes in the road speed, and automatic downward changes are similarly effected as the road speed falls, or as the throttle opening necessary to maintain a given speed increases.

If it is desired to engage the intermediate ratio when the road speed is such that direct drive is selected by the centrifugal governor, and the throttle opening to maintain that speed is such that the spring 145 cannot hold the governor in the position to select intermediate ratio, the accelerator pedal is depressed to its full extent to close the switch 118b, and energise the solenoid of the valve 118, the piston 128 in the cylinder 127 being thus moved to cause the stem 129 to move the rocking member 89 and return the plunger of the valve 93, 94 to a position in which liquid pressure is cut-off from the motor cylinder 61, and liquid under pressure is admitted to the motor cylinder 75 to engage the brake band 70. The conditions thus revert to those shown in FIGURES 12 and 18, but the switch 118b is closed instead of the switch 118a as shown in FIGURE 12.

Figure 20:
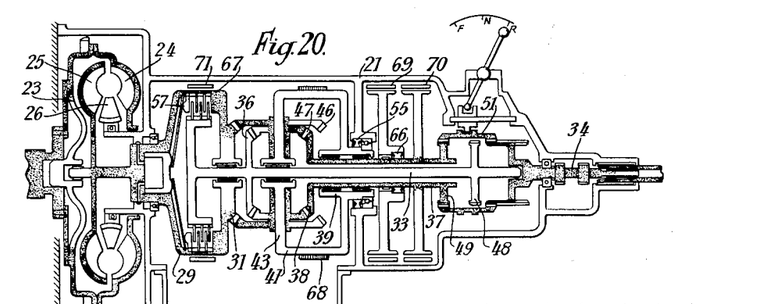
FIGURE 20 showing the gearbox with reverse gear engaged.

Reverse drive is obtained by moving the selector lever 52 to the position shown in FIGURES 14 and 20, thus engaging the dogs 49 on the sleeve 37 with the dogs 51 coupled to the driven shaft 34. The movement of the selector lever 52 to this position moves the slide valve 116 to admit liquid under pressure to the motor cylinder 72 and contract the brake band 68 acting on the drum 41. The carrier 43 is thus held against the torque reaction which, under these conditions, tends to rotate it in the same direction as the input gear 31. The output gear 36 is free to rotate, so that the drive ratio is the same as for the lowest forward speed.

It will be observed from the foregoing description that the changes of gear ratio in an upward direction are effected automatically, in accordance with changes in the road speed of the vehicle and of the degree of throttle opening, by the centrifugal governor, and it will be evident that downward changes will be similarly effected as the vehicle speed changes in a downward direction or the throttle opening to maintain a given speed increases. An overriding control is provided by the solenoid-operated valve 118 to enable the intermediate gear ratio to be held at combinations of road speed and throttle opening when direct drive would normally be engaged, and to enable a change to be made from direct drive to intermediate gear ratio at such road speeds.

It will be understood that the arrangement of the gearbox may be modified in various ways without departing from the scope of the appended claims. For example, the output shaft may extend right through the gearbox from a journal bearing in the input member, the output gears and the carrier being mounted each on one of three sleeves rotatable on the said output shaft. The various brakes, or some of them, may be replaced by friction clutches.

We claim:

1. An automatic change-speed gearbox comprising an input shaft, an output shaft and constantly meshed speed reduction gearing through which rotation is transmitted from said input shaft to said output shaft, a first intermediate shaft coaxial with said input shaft, a second intermediate shaft rotatably mounted on said first intermediate shaft and a rotatable carrier assembly mounted on said first intermediate shaft, said speed reduction gearing including at least two intermediate gear assemblies mounted on said carrier assembly and each consisting of a large bevel gear and a small bevel gear fixed together to rotate as one about an axis radial to said intermediate shaft, an input bevel gear mounted on said input shaft and meshing with the large bevel gears of said intermediate gear assemblies, a pair of output bevel gears mounted respectively on the first and second intermediate shafts and meshing with the small bevel gears of said intermediate gear assemblies at opposite ends of a diameter of said small bevel gears, first and second selectively operable clutch means to connect said first and second intermediate shafts respectively to said output shaft, means acting on said carrier to hold it against rotation when either one of the said clutch means is operable to provide forward and reverse drives at the same speed ratio, a first brake acting on said second intermediate shaft through a free wheel to hold said shaft against backward rotation, a second brake acting on said second intermediate shaft to hold said shaft against any rotation in either direction, and means operable to lock said gears together to rotate as one.

2. An automatic change-speed gearbox according to claim 1, wherein a first brake and a free wheel are provided to lock the carrier assembly against rotation in the same direction as the input bevel gear and a friction brake is provided to lock the carrier assembly against rotation in either direction.

3. An automatic change-speed gearbox according to claim 1, wherein the clutch means for connecting said first and second intermediate shafts to said output shaft comprises dog clutches selectively operable by a manual control lever.

4. An automatic change-speed gearbox according to claim 3, wherein the manual control lever is operatively connected to a valve device in a fluid line between a fluid pressure source and a centrifugally operated control valve to admit liquid under pressure to the control valve during forward drive with a first dog clutch engaging the output gear on the first intermediate shaft with the output shaft, and said manual control valve operating the valve device to admit liquid under pressure directly to said second brake isolating said control valve during reverse with a second dog clutch engaging the output gear on the second intermediate shaft with the output shaft.

5. An automatic change-speed gearbox according to claim 1, wherein the means operable to lock the gears together comprises a friction clutch operable to prevent relative rotation of the input bevel gear and the output bevel gear on the first intermediate shaft.

6. An automatic change-speed gearbox according to claim 5, wherein a speed-sensitive control is provided for said friction clutch and said first brake, said control comprising a centrifugal governor connected to and driven by the output shaft of the gearbox, a control valve operatively connected to the governor, said valve being connected between a fluid pressure source and said friction clutch and the first brake, said control valve being operated by the governor to admit liquid under pressure to the first brake and to said friction clutch causing them to be engaged at first and second rotational speeds, respectively, of the output shaft.

7. An automatic change-speed gearbox according to claim 6, wherein resilient means are operatively connected to said governor to oppose the force thereof, a throttle of an engine driving said gearbox operatively connected to said resilient means and operative to increase the loading thereof upon opening of said throttle.

8. An automatic change-speed gearbox according to claim 5, wherein means for causing said friction clutch and said first brake to be engaged comprises: a liquid sump, a pressure pump connected thereto, a control valve connecting said pressure pump to said friction clutch and said first brake, a centrifugal governor connected to and driven by the output shaft of the gearbox, said governor also connected to said control valve whereby said valve is opened causing said first brake to be engaged upon said output shaft attaining a first predetermined rotational speed and causing said friction clutch to be engaged at a second, higher predetermined rotational speed 9. An automatic change-speed gearbox according to claim 8, wherein said second brake is connected to and controlled by first and second normally closed valve means, said valve means being connected in series to a source of fluid under pressure, solenoid means for biasing said first valve means to open position, means forming a part of the second valve and responsive to the opening of said first valve to inhibit the movement of said centrifugal governor and thereby the movement of said control valve so that upon opening of said second valve said first and second brakes will be engaged and said friction clutch will be disengaged.

10. An automatic change-speed gearbox according to claim 9, wherein a manually operated switch and a switch actuated by full depression of an accelerator pedal of an engine driving the gearbox controls said solenoid-operated valve.

References Cited by the Examiner
UNITED STATES PATENTS

| | | | |
|---|---|---|---|
| 2,220,174 | 11/40 | Ravigneaux | 74—759 |
| 2,361,104 | 10/44 | Jandasek | 74—757 |
| 2,530,200 | 11/50 | Hobbs. | |
| 2,608,885 | 9/52 | Lapsley | 74—732 |
| 2,641,144 | 6/53 | Schneider | 74—732 |
| 2,747,431 | 5/56 | Roche. | |
| 2,856,794 | 10/58 | Simpson | 74—763 |
| 2,862,403 | 12/58 | Miller | 74—763 |
| 2,882,756 | 4/59 | Polomski. | |
| 2,888,834 | 6/59 | Lowe. | |
| 2,895,344 | 7/59 | Holdeman et al. | |
| 2,942,498 | 6/60 | Henderson | 74—759 |
| 2,982,155 | 5/61 | Ellis | 74—757 X |
| 2,997,898 | 8/61 | Ellis | 74—757 X |
| 3,008,352 | 11/61 | Peras | 74—732 |
| 3,055,232 | 9/62 | Dodge | 74—677 |

DON A. WAITE, *Primary Examiner.*
BROUGHTON G. DURHAM, *Examiner.*